2,744,916

PHENYL-SUBSTITUTED SALICYLAMIDES

Melville Sahyun, John A. Faust, and Leonard H. Jules, Santa Barbara, Calif., assignors, by mesne assignments, to Cutter Laboratories, Inc., Berkeley, Calif., a corporation of California No Drawing. Application February 12, 1953, Serial No. 336,643

6 Claims. (Cl. 260—326.3)

This invention relates to phenyl-substituted salicylamide derivatives and is more particularly concerned with N,N-di-substituted derivatives of phenylsalicylamides. The compounds of the present invention have the following formula:

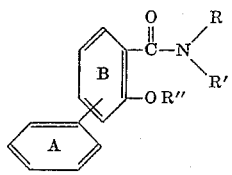

wherein R″ is selected from the group consisting of hydrogen, lower-hydroxyalkyl, lower alkenyl, and lower alkyl, wherein R and R′ are selected from the group consisting of lower alkyl groups which may be the same, different, or joined together to form a heterocyclic ring, and wherein the phenyl ring (A) may be in the 3-, 4-, or 5-position of the salicylamide phenyl ring (B).

The novel compounds of the present invention have utility as analgesics, possessing a high degree of central nervous system depressant activity with a low toxicity, as well as being useful chemical intermediates in the preparation of more complex organic molecules.

3-, 4-, and 5-phenyl-substituted salicylic acids are commercially available. The preparation of compounds within the scope of the present invention is best accomplished by preparing an appropriate ester of phenyl-substituted salicylic acids and subsequently replacing the esterificant with an appropriate substituted amino group by reaction with di-substituted amines. Representative esters which are suitable for reaction with di-substituted amines, include, for example, aryl esters, such as the phenyl, naphthyl, methoxyphenyl, chlorophenyl, et cetera, of appropriate acids, such as 3-, 4-, or 5-phenylsalicylic acids, 3-, 4-, or 5-phenyl-2-alkoxybenzoic acids, 3-, 4-, or 5-phenyl-2-(alkoxy-ol)benzoic acids, 3-, 4-, or 5-phenyl-2-alkenyloxybenzoic acids. The 2-position of the esters may be substituted by hydroxy, lower alkoxy, such as for example, methoxy, ethoxy, propoxy, isopropoxy, butoxy, isobutoxy, tertiary-butoxy, pentoxy, hexoxy, heptoxy, octoxy, isooctoxy, et cetera, lower alkenyloxy, such as, for example, propenoxy, butenoxy, isobutenoxy, pentenoxy, hexenoxy, heptenoxy, octenoxy, isooctenoxy, et cetera, or, alkoxy-ol, such as, for example, hydroxyethoxy, hydroxypropoxy, hydroxyisopropoxy, hydroxybutoxy, hydroxypentoxy, hydroxyhexoxy, hydroxyisohexoxy, hydroxyheptoxy, hydroxyoctoxy, et cetera. Representative disubstituted amines suitable for reaction with the above-outlined esters include, for example, piperidine, morpholine, pyrrolidine, thiomorpholine, dimethylamine, methylethylamine, diethylamine, dipropylamine, diisopropylamine, dibutylamine, isobutylpentylamine, dipentylamine, dioctylamine, diheptylamine, diisohexylamine, et cetera.

The reaction is usually conducted at temperatures between about 20 and 100 degrees centigrade, preferably at about room temperature, and the reaction time will vary between a few hours and several days, depending on the reaction temperature and the particular reactants employed. A solvent may be used, if desired, however with non-volatile amines its presence is not required. Contact of the reactants is sufficient to cause reaction. Reaction product may be separated by adding water, reducing the volume of the mixture, and extraction with a suitable immiscible solvent, such as, for example, ether, chloroform, et cetera. The compounds of the present invention are viscous oils or crystallines solids, slightly soluble in water and soluble in alcohols.

An alternative method of preparation of the compounds of the present invention contemplates the preparation of an acid chloride corresponding to the acids above-defined, and this acid chloride reacted with a suitable di-substituted amine, as above-outlined, by contacting the materials at temperatures between about 20 and 100 degrees centigrade. Separation of the reaction product is accomplished in a conventional manner.

The following examples are given to illustrate procedures for preparing the compounds of the present invention but it is to be understood that the said examples are not to be construed as limiting the invention thereto.

PREPARATION 1.—PREPARATION OF METHYL 3-PHENYLSALICYLATE

A mixture of 21.4 grams (0.1 mole) of 3-phenylsalicylic acid, 15.8 grams (0.125 mole) of dimethyl sulfate, 10.5 grams (0.125 mole) of sodium bicarbonate and 100 milliliters of dry acetone was refluxed for a period of twenty hours. The acetone was then removed by distillation, the resulting residue mixed with 200 milliliters of water, and the aqueous suspension extracted with ether. The combined ether extracts were washed with dilute sodium bicarbonate solution and dried over anhydrous magnesium sulphate. The ether was removed by distillation and the residue fractionally distilled. From the fraction boiling at 145–148 degrees centigrade at one millimeter of mercury absolute pressure, 18.2 grams (80 percent of the theoretical yield) of a yellowish liquid solidified upon standing. Recrystallization from methanol yielded colorless needles of methyl 3-phenylsalicylate, melting at 59–60 degrees centigrade.

In a manner similar to that of Preparation 1, other alkyl esters of 3-, 4-, or 5-phenylsalicylates may be prepared by substituting the appropriate di-(lower-alkyl)-sulfate for dimethylsulfate and 4-, or 5-phenylsalicylic acid for the 3-phenylsalicylic acid.

PREPARATION 2.—METHYL 2-METHOXY-3-PHENYLBENZOATE

Twenty-two and eight-tenths (22.8) grams (0.1 mole) of methyl 3-phenylsalicylate were added to a solution of 2.3 grams of sodium in 100 milliliters of methanol. After the addition of 100 milliliters of toluene, the mixture was fractionally distilled to remove the methanol, and the residue treated with 12.5 grams (0.1 mole) of dimethylsulfate. The resulting admixture was refluxed for about twenty hours and cooled. Ether was added and the mixture was extracted with dilute sodium carbonate solution. The dried ether solution was fractionally distilled to yield 14.3 grams (59 percent of the theoretical yield) of methyl 2-methoxy-3-phenylbenzoate, boiling at 140–142 degrees centigrade at one millimeter of mercury absolute.

In a manner similar to that of Preparation 2, other alkyl esters of 2-alkoxy-3-, 4-, or 5-phenylsalicylates may be prepared by substituting alkyl esters of 4-, or 5-phenylsalicylates for the methyl 3-phenylsalicylates and other di-(lower-alkyl)sulfates for the dimethyl sulfate.

PREPARATION 3.—PHENYL 3-PHENYLSALICYLATE

A mixture of 128.5 grams (0.6 mole) of 3-phenylsalicylic acid, 56.6 grams (0.6 mole) of phenol and 30.7 grams (0.2 mole) of phosphorous oxychloride was heated at 110–120 degrees centigrade until the evolution of hydrogen chloride gas has ceased. The hot, liquid reaction mixture was poured into 500 milliliters of water, and stirred until the oil solidified. The solid was separated, washed with water, and digested in a warm dilute sodium carbonate solution. The mixture was filtered, and the resulting orange solid was purified by two recrystallizations from isopropanol. There was thus obtained 104.5 grams (60 percent of the theoretical yield) of phenyl 3-phenylsalicylate melting at 95–96 degrees centigrade.

PREPARATION 4.—PHENYL 4-PHENYLSALICYLATE

A mixture of 64.2 grams of 4-phenylsalicylic acid, 28.2 grams of phenol and 16.9 grams of phosphorous oxychloride was treated in a manner described in Preparation 3. There was thus obtained 54 grams of phenyl 4-phenylsalicylate melting at 114–115 degrees centigrade.

PREPARATION 5.—PHENYL 5-PHENYLSALICYLATE

A mixture of 128.5 grams of 5-phenylsalicylic acid, 56.6 grams of phenol, and 46 grams of phosphorous oxychloride was treated in the manner described in Preparation 3. The solid was crystallized from an acetone-methanol mixture, as a yellow product weighing 96 grams and melting at 95–97 degrees centigrade.

In a manner similar to that of Preparations 3, 4 and 5, other aryl esters of 3-, 4-, or 5-phenylsalicylates may be prepared by substituting an appropriate hydroxylated aryl compound for the phenol of the above preparations.

PREPARATION 6.—3-PHENYLACETYLSALICYLOYL CHLORIDE

A mixture of 51.2 grams (0.2 mole) of 3-phenylacetylsalicylic acid, 42 milliliters (0.6 mole) of thionyl chloride, and fifty milliliters of benzene was refluxed for eight hours. The benzene and excess thionyl chloride were removed by distilling under reduced pressure, and the residue dissolved in 100 grams of anhydrous dioxane. This material was used in the following examples without purification, it being calculated as 100 percent acid chloride.

PREPARATION 7.—PHENYL 2-(2-HYDROXYETHOXY)-3-PHENYLBENZOATE

A solution of 27.9 grams (0.1 mole) of phenyl 3-phenylsalicylate, 6.0 grams (0.15 mole) of sodium hydroxide, and 8.0 grams (0.1 mole) of ethylene chlorohydrin in 200 milliliters of water was heated in a water bath at 90–100 degrees centigrade for eight hours. The mixture was cooled and extracted with chloroform. The extract was washed with water and very dilute sodium bisulfite, dried, and the solvent removed by distillation. There was thus prepared phenyl 2-(2-hydroxyethoxy)-3-phenylbenzoate.

In a manner similar to that of Preparation 7, other 2-hydroxy-alkoxyphenylbenzoates may be prepared by substituting other halogenated alkylenehydrins, for example, propylene bromohydrin, butylene iodohydrin, et cetera, for the ethylene chlorohydrin and a 4-, or 5-phenylsalicylate for the 3-phenylsalicylate of the above preparation.

PREPARATION 8.—PHENYL 2-PROPENOXY-3-PHENYLBENZOATE

A mixture of 27.9 grams (0.1 mole) of phenyl-3-phenylsalicylate, 7.7 grams (0.1 mole) of allyl chloride, 1.6 grams (0.01 mole) of potassium iodide, 13.8 grams (0.1 mole) of potassium carbonate, and 150 milliliters of dry acetone was refluxed for eight hours, then combined with 600 milliliters of dilute sodium hydroxide having a pH between about 9 and 11. The mixture was extracted with three 100-milliliter portions of ether, the ether extracts combined, washed with water and dried over magnesium sulfate. By removing the ether by distillation, there was obtained phenyl 2-propenoxy-3-phenylbenzoate.

In a manner similar to that of Preparation 8, other 2-alkenoxy-phenylbenzoates may be prepared by substituting other halogenated alkylene compounds, for example, methylallyl bromide, propylallyl iodide, et cetera, for the allyl chloride, and a 4-, or 5-phenylsalicylate for the 3-phenylsalicylate of the above preparation.

Example 1.—N,N-dimethyl-4-phenylsalicylamide

A mixture of 55 grams (0.3 mole) twenty-five percent aqueous dimethylamine and 43.5 grams (0.15 mole) phenyl 4-phenylsalicylate was heated at 85–95 degrees centigrade for 17 hours. Water was added and the mixture was distilled under reduced pressure to remove phenol and excess dimethylamine.

A solid separated during this operation. After acidifying the residue with dilute hydrochloric acid, the solid was collected, washed with water, dilute sodium bicarbonate, and then again with water. Crystallization of this product from isopropyl alcohol yielded colorless needles melting at 165–166 degrees centigrade and weighing 31.5 grams (86 percent of the theoretical yield). This material has a solubility of less than 0.5 percent in water and approximately 0.5 percent in propylene glycol at twenty degrees centigrade. It has a pH of 6.50 in a saturated aqueous solution.

*Analysis.*—Calculated: N 5.80. Found: N 5.82

In a manner similar to that of Example 1, other N,N-dialkyl-4-phenylsalicylamides may be prepared, for example, the N-methyl-N-ethyl-4-phenylsalicylamide, N,N-diethyl-4-phenylsalicylamide, N,N-dipropyl-4-phenylsalicylamide, N,N-dioctyl-4-phenylsalicylamide, et cetera, by substituting the appropriate disubstituted amine for the dimethylamine of the above example.

Example 2.—N-(3-phenylsalicylolyl)pyrrolidine

A mixture of 58.1 grams (0.2 mole) of phenyl 3-phenylsalicylate and 21.3 grams (0.3 mole) of pyrrolidine was heated in an oil bath at 190–195 degrees centigrade for four hours, then the phenol and excess amine were distilled off under reduced pressure. The liquid residue was washed with water, dissolved in methanol, and the solution treated with charcoal and diluted with water to promote crystallization of the product. Recrystallization of this material from methanol yielded yellowish platelets melting at 80–81 degrees centigrade and weighing 39 grams (73 percent of the theoretical yield). N-(3-phenylsalicyloyl) pyrrolidine has a solubility of less than 0.5 percent in both water and propylene glycol at twenty degrees centigrade. It has a pH of 6.45 in a saturated aqueous solution.

*Analysis.*—Calculated: N 5.35. Found: N 5.23.

In a manner similar to that of Example 2, other heterocyclic amines may form the amide of a phenyl-substituted salicylamide, by substituting a 4-, or 5-phenylsalicylate for the 3-phenylsalicylate of the example, and a suitable heterocyclic amine, for example, morpholine, thiomorpholine, et cetera, for the pyrrolidine of the above example.

Example 3.—N,N-dimethyl-5-phenylsalicylamide

A mixture of 100 grams (0.55 mole) of twenty-five percent aqueous dimethylamine and 65 grams (0.22 mole) of phenyl 5-phenylsalicylate, contained in a citrate bottle, was heated in an oil bath at 85–95 degrees centigrade for 22 hours. Water was added to the mixture and the mixture distilled under reduced pressure to remove phenol and excess dimethylamine. The residue was extracted with ether, and the ether solution washed with dilute sodium bicarbonate, water, ten percent hydrochloric acid, and water, respectively, and dried over anhydrous magnesium sulfate. Drying of the ether extract resulted in the precipitation of the product. The mixture of product and magnesium sulfate was collected in a Buchner funnel, washed with dry ether and then washed with water to dissolve the magnesium sulfate. Crystallization of the product from dilute isopropyl alcohol gave coarse yellowish needles, melting at 171–172 degrees centigrade and weighing 37 grams (67 percent of the theoretical yield). N,N-dimethyl-5-phenylsalicylamide has a solubility of less than 0.5 percent in both water and propylene glycol at twenty degrees centigrade. Its saturated aqueous solution has a pH of 6.40.

*Analysis.*—Calculated: N 5.80. Found: N 5.81.

In a manner similar to that of Example 3, other N,N-dialkyl-5-phenylsalicylamides may be prepared, for example, N,N-diheptyl-5-phenylsalicylamide, N,N-dihexyl-5-phenylsalicylamide, N-butyl-N-heptyl-5-phenylsalicylamide, et cetera, by substituting the appropriate disubstituted amine for the dimethylamine of the above example.

*Example 4.—N,N-dimethyl-3-phenylsalicylamide*

A mixture of 43.5 grams (0.15 mole) of phenyl 3-phenylsalicylate, 55 grams (0.3 mole) of 25 percent aqueous dimethylamine, and 75 milliliters of methanol contained in a pressure bottle, was heated in a water bath at 90–100 degrees for twelve hours. The solvent was distilled off and the residue steam-distilled to remove phenol. Warming of the oil residue with dilute sodium bicarbonate resulted in a solidification of the oil. This solid was collected in a Buchner funnel, washed with water, and dissolved in acetone. After treating the acetone solution with charcoal, water was added to promote crystallization of the product. The product was finally recrystallized from dilute methanol to give N,N-dimethyl-3-phenylsalicylamide, as slightly yellowish platelets melting at 76–77 degrees centigrade and weighing 17.0 grams (47 percent of the theoretical yield). This material has a solubility of less than 0.5 percent in water at twenty degrees centigrade and of approximately three percent in propylene glycol at twenty degrees centigrade. A saturated aqueous solution has a pH of 5.75.

*Analysis.*—Calculated: N 5.80. Found: N 5.74.

In a manner similar to that of Example 4, other N,N-dialkyl-3-phenylsalicylamides may be prepared, for example, N,N-dipentyl-3-phenylsalicylamide, N-methyl-N-ethyl-3-phenylsalicylamide, N,N-dibutyl-3-phenylsalicylamide, et cetera, by substituting the appropriate disubstituted amine for the dimethylamine of the above example.

*Example 5.—N,N-diethyl-3-phenylsalicylamide*

Following the procedure of Example 4, 6.8 grams of diethylamine in dioxane was contacted with a mixture of 3-phenylacetylsalicyloyl chloride in dioxane. After recrystallization from dilute methanol, a colorless crystalline product, N,N-diethyl-3-phenylsalicylamide, melting at 90–91 degrees centigrade and weighing 4.6 grams (48 percent of the theoretical yield) was obtained. This material is less than 0.5 percent soluble in water at twenty degrees centigrade but is soluble in ethanol. Its saturated aqueous solution has a pH of 5.02.

*Analysis.*—Calculated: N 5.20. Found: N 5.12.

*Example 6.—N-(3-phenylsalicyloyl)piperidine*

A mixture of 6.8 grams (0.08 mole) of piperidine in twenty milliliters of dioxane was cooled in an ice bath and agitated during the addition, in small proportions, of thirty grams (0.039 mole) of 3-phenylacetylsalicyloyl chloride in dioxane, prepared as described in Preparation 6. After the addition was completed, the mixture was warmed to room temperature, diluted with water, and extracted with ether. The ether extract was contacted with an aqueous solution of sodium bicarbonate, the ether distilled off and the residue refluxed with six grams (0.15 mole) of sodium hydroxide, 100 milliliters of water and fifty milliliters of methanol for three hours. After cooling, the mixture was filtered, and the filtrate acidified with hydrochloric acid, whence a precipitate separated. This solid was dissolved in methanol, treated with charcoal, the mixture filtered and cooled, thereby causing the formation of crystals. After recrystallization from dilute isopropanol, yellowish platelets, melting at 111–112 degrees centigrade and weighing 4.2 grams (38 percent of the theoretical yield) was obtained. This material N(3-phenylsalicyloyl)piperidine has a pH of 5.20 in a saturated aqueous solution, is soluble in ethanol, and is less than 0.5 percent soluble in water at twenty degrees centigrade.

*Analysis.*—Calculated: N 4.98. Found: N 4.91.

Sixty-one and four-tenths grams (0.2 mole) of phenyl 2-methoxy-3-phenylbenzoate, 360 grams (2.0 moles) of a twenty-five percent aqueous dimethylamine solution and 100 milliliters of methanol were admixed in a one-liter flask and the resulting mixture permitted to stand at room temperature for seven days. The contents of the flask were then evaporated to one-quarter of the original volume, 100 milliliters of water added and the distillation continued until the concentrated residue was only slightly basic. Acidification of the basic residue with hydrochloric acid yielded a white solid precipitate which was dissolved in isopropanol and further purified with activated charcoal. Gradual addition of water to the isopropanol mixture, accompanied by cooling of the mixture by means of an ice bath, resulted in the crystallization as colorless platelets of N,N-dimethyl-2-methoxy-3-phenylbenzamide, melting at 76–77 degrees centigrade and having a molecular weight of 255.31. The material exhibited a solubility of less than 0.5 percent in water at twenty degrees centigrade, and was soluble to the extent of approximately three percent in propylene glycol at twenty degrees centigrade. The pH of its saturated aqueous solution was 5.75.

*Analysis.*—Calculated: N 5.80. Found: N 5.74.

In a manner similar to that of Example 7, other disubstituted amines may be substituted for the dimethylamine, the other 2-lower-alkoxy- and phenyl-substituted benzoates may replace the 2-methoxy-3-phenylbenzoate of the example to prepare, for example, N,N-diethyl-2-ethoxy-4-phenylbenzamide, N,N-dioctyl-2-propoxy-5-phenylbenzamide, N-methyl-N-ethyl-2-heptoxy-4-phenylbenzamide, N,N-dipropyl-2-pentoxy-3-phenylbenzamide, et cetera.

*Example 8.—N,N-dimethyl-2-(2-hydroxyethoxy)-3-phenylbenzamide*

A mixture of 33.5 grams (0.1 mole) of phenyl 2-(2-hydroxyethoxy)-3-phenylbenzoate, 180 grams (0.1 mole) of a twenty-five percent aqueous dimethylamine solution and 100 milliliters of methanol was allowed to stand at room temperature for nine days. The mixture was then distilled to remove three-quarters of the volume, 100 milliliters of water added and the distillation continued until the residue was only slightly basic. After cooling, the mixture was extracted with chloroform, the extract washed with water and very dilute sodium bisulfite, dried, and the solvent removed by distillation. The residue was distilled at 194–212 degrees centigrade (one millimeter of mercury absolute), the distillate taken up in ether, washed with dilute sodium hydroxide, saturated sodium chloride solution, dried and the ether removed. There was thus obtained N,N-dimethyl-2-(2-hydroxyethoxy)-3-phenyl-benzamide, as a viscous yellowish oil having a solubility of less than 0.5 percent in water and more than ten percent in propylene glycol at twenty degrees centigrade. Its pH in a saturated aqueous solution is 6.8.

*Analysis.*—Calculated: N 4.90. Found: N 4.83.

In a manner similar to that of Example 8, other disubstituted amines may be substituted for the methylamine, 4- or 5-phenyl-benzoates may be substituted for the 3-phenylbenzoate, and other 2-alkoxyhydroxy-substituents, such as, for example, hydroxypropoxy, hydroxybutoxy, hydroxypentoxy, hydroxyhexoxy, hydroxyheptoxy, hydroxyisooctoxy, et cetera, may be substituted for the hydroxyethoxy of the example to prepare compounds of the present invention.

*Example 9.—N,N-dimethyl-2-(2-propenoxy)-3-phenylbenzamide*

A mixture of 33.1 grams (0.1 mole) of phenyl 2-propenoxy-3-phenylbenzoate, 180 grams (1.0 mole) of a twenty-five percent aqueous dimethylamine solution and 150 milliliters of methanol was allowed to stand for eleven days at room temperature. The mixture was then evaporated to 25 percent of the original volume, 100 milliliters of water added and the distillation continued until the concentrated residue was only slightly basic. After extraction with ether, the extracts were combined, washed with water and dried with magnesium sulfate. After removal of the ether, the residue distilled at 180–183 degrees centigrade at approximately one millimeter of mercury absolute. N,N-dimethyl-2-(2-propenoxy)-3-phenylbenzamide is a viscous yellowish oil, less than 0.5 percent soluble in water and at least twenty percent soluble in propylene glycol at twenty degrees centigrade. Its saturated aqueous solution has a pH of 5.90.

*Analysis.*—Calculated: N 4.98. Found: N 4.95.

In a manner similar to that of Example 9, other disubstituted amines may be substituted for the dimethylamine, 4- or 5-phenylbenzoate may be substituted for the 3-phenylbenzoate and other alkenoxy groups, such as, for example, butenoxy, isobutenoxy, pentenoxy, hexenoxy, heptenoxy, isoheptenoxy, octenoxy, et cetera, may be substituted for the propenoxy group of the example to prepare other compounds within the scope of the present invention.

Various modifications may be made in the method of the present invention without departing from the spirit or scope thereof, and it is to be understood that we limit ourselves only as defined in the appended claims.

We claim:

1. A compound having the formula:

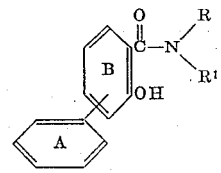

wherein R and $R^1$ are selected from the group consisting of lower alkyl radicals and lower alkyl radicals which are joined together to form a heterocyclic ring selected from the group consisting of pyrrolidyl and piperidyl, and wherein the A-phenyl ring is located in a position selected from the group consisting of the 3-, 4- and 5- positions of the B-phenyl ring.

2. N,N-dimethyl-4-phenylsalicylamide.
3. N-(3-phenylsalicyloyl)pyrrolidine.
4. N,N-dimethyl-5-phenylsalicylamide.
5. N,N-dimethyl-3-phenylsalicylamide.
6. N,N-diethyl-3-phenylsalicylamide.

References Cited in the file of this patent

UNITED STATES PATENTS

| | | |
|---|---|---|
| 2,025,587 | Haller et al. | Dec. 24, 1935 |
| 2,190,829 | Graves | Feb. 20, 1940 |

FOREIGN PATENTS

| | | |
|---|---|---|
| 437,675 | Great Britain | Nov. 4, 1935 |

OTHER REFERENCES

Richtzenhain et al.: Berichte, vol. 77B, pp. 566-572 (1944).